(No Model.) 6 Sheets—Sheet 1.

G. W. CRANE & H. BRADSHAW.
DEVICE FOR FEEDING PAPER.

No. 418,942. Patented Jan. 7, 1890.

WITNESSES:
Francis McArdle.
C. Sedgwick

INVENTOR
G. W. Crane
H. Bradshaw
BY
ATTORNEY

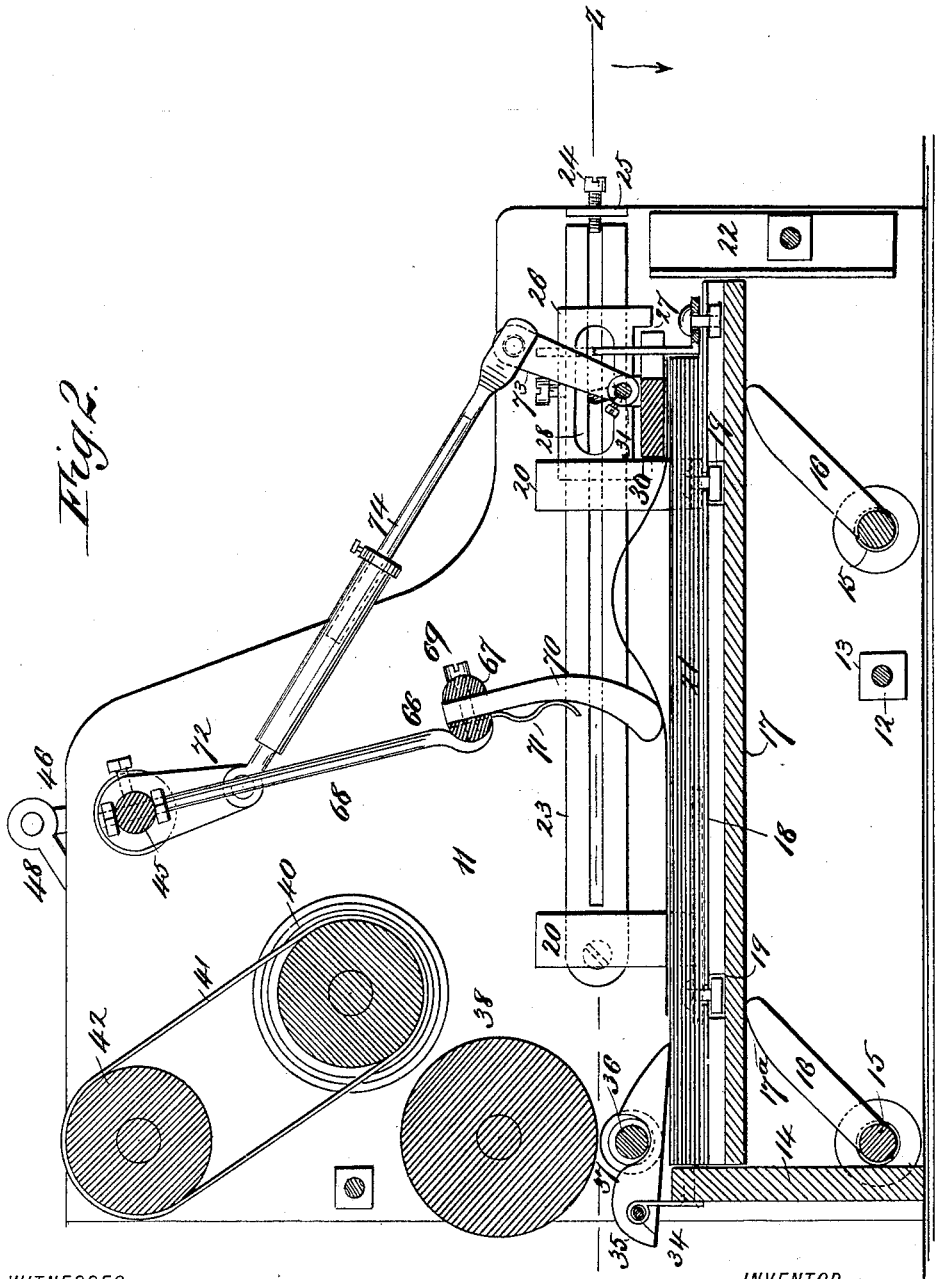

(No Model.) 6 Sheets—Sheet 3.
G. W. CRANE & H. BRADSHAW.
DEVICE FOR FEEDING PAPER.
No. 418,942. Patented Jan. 7, 1890.
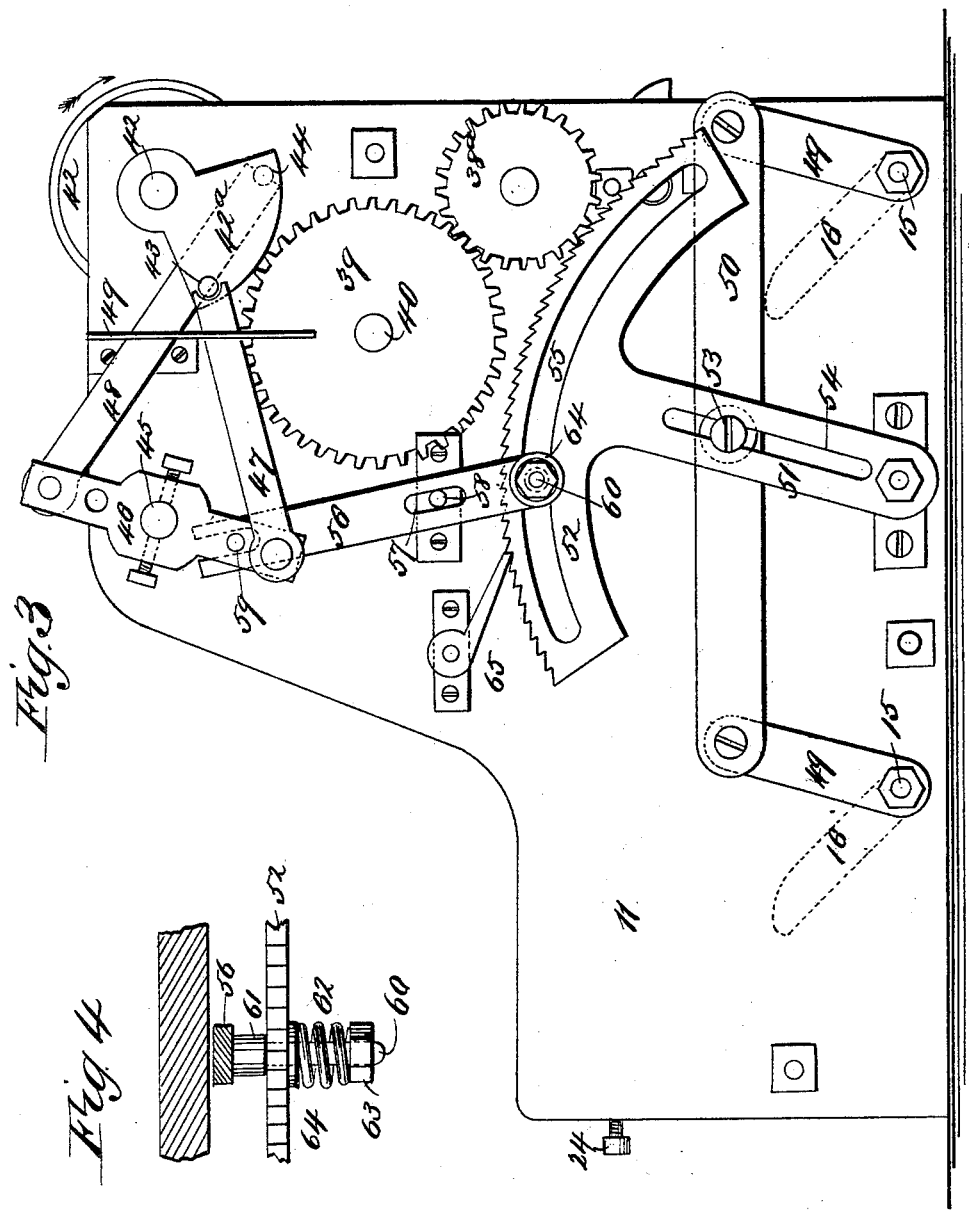
WITNESSES:
Francis McArdle
C. Sedgwick
INVENTOR
G. W. Crane
H. Bradshaw
BY Munn & Co.
ATTORNEY (No Model.) 6 Sheets—Sheet 4.
G. W. CRANE & H. BRADSHAW.
DEVICE FOR FEEDING PAPER.
No. 418,942. Patented Jan. 7, 1890.
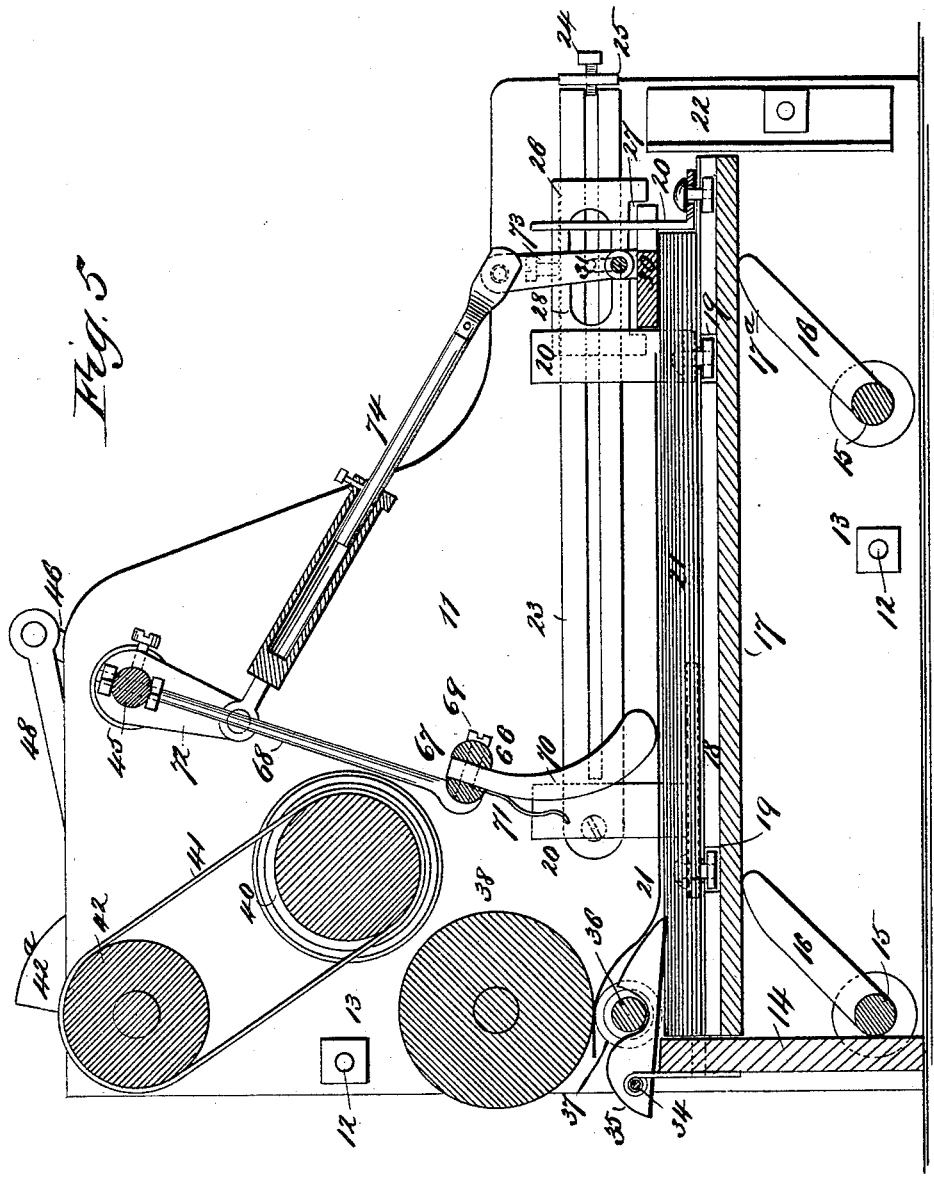

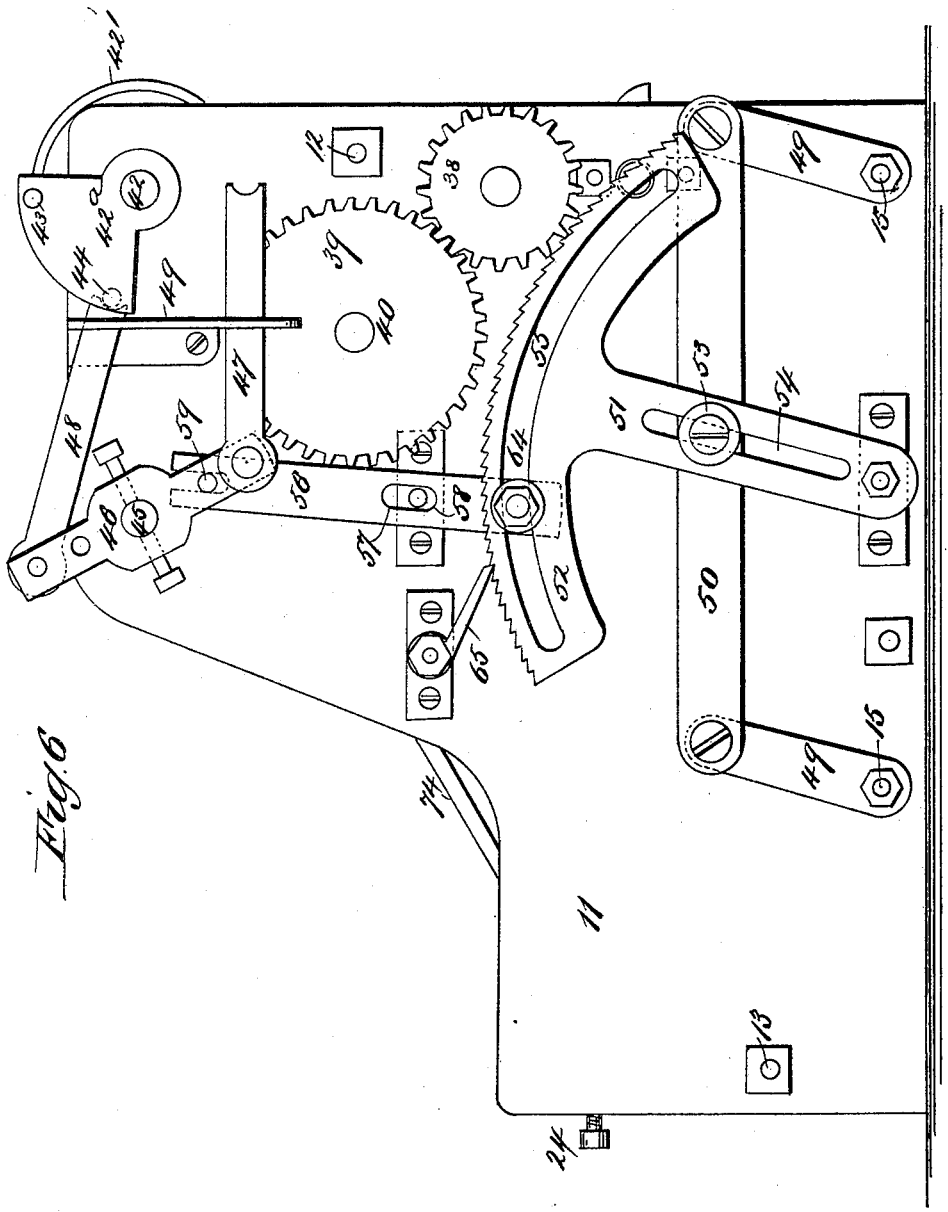

(No Model.) 6 Sheets—Sheet 6.

G. W. CRANE & H. BRADSHAW.
DEVICE FOR FEEDING PAPER.

No. 418,942. Patented Jan. 7, 1890.

WITNESSES:
Francis McArdle
C. Sedgwick

INVENTOR
G. W. Crane
H. Bradshaw
BY Munn & Co.
ATTORNEY

UNITED STATES PATENT OFFICE.

GEORGE WOOLSEY CRANE AND HARRY BRADSHAW, OF TOPEKA, KANSAS.

DEVICE FOR FEEDING PAPER.

SPECIFICATION forming part of Letters Patent No. 418,942, dated January 7, 1890.

Application filed July 11, 1888. Renewed December 10, 1889. Serial No. 333,178. (No model.)

*To all whom it may concern:*

Be it known that we, GEORGE WOOLSEY CRANE and HARRY BRADSHAW, both of Topeka, in the county of Shawnee and State of Kansas, have invented a new and Improved Device for Feeding Paper, of which the following is a full, clear, and exact description.

Our invention relates to an improvement in devices for feeding paper into a ruling-machine, a printing-press perforator, or any machine to which paper is to be fed one sheet at a time from a heap; and the object of the invention is to provide a simple, durable, and effective device, which will be automatic in its action and reliable in operation.

The invention consists in the construction and combination of the several parts, as will be hereinafter fully described, and pointed out in the claims.

Reference is to be had to the accompanying drawings, forming a part of this specification, in which similar figures of reference indicate corresponding parts in all the views.

Figure 1:
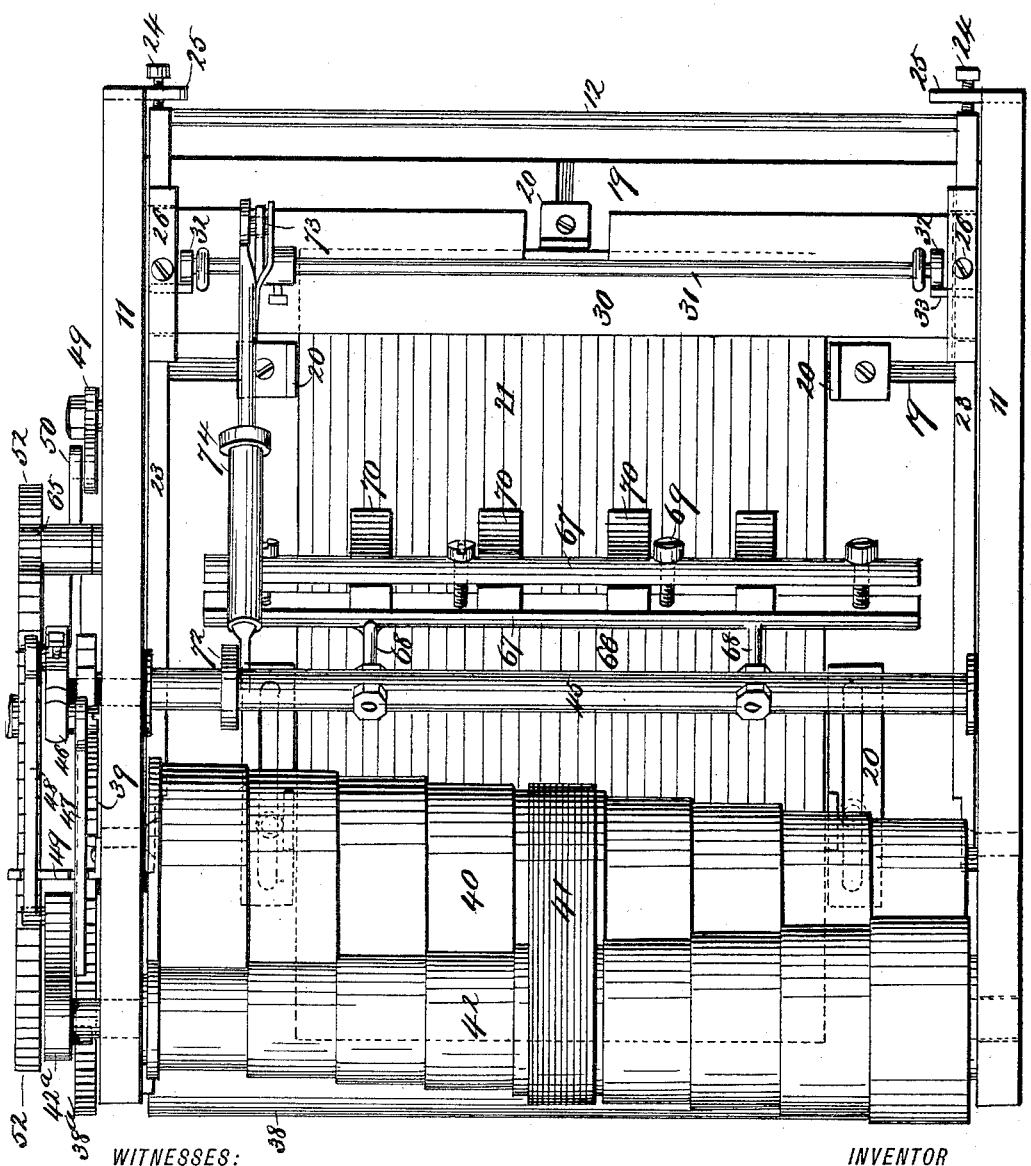
Figure 7:
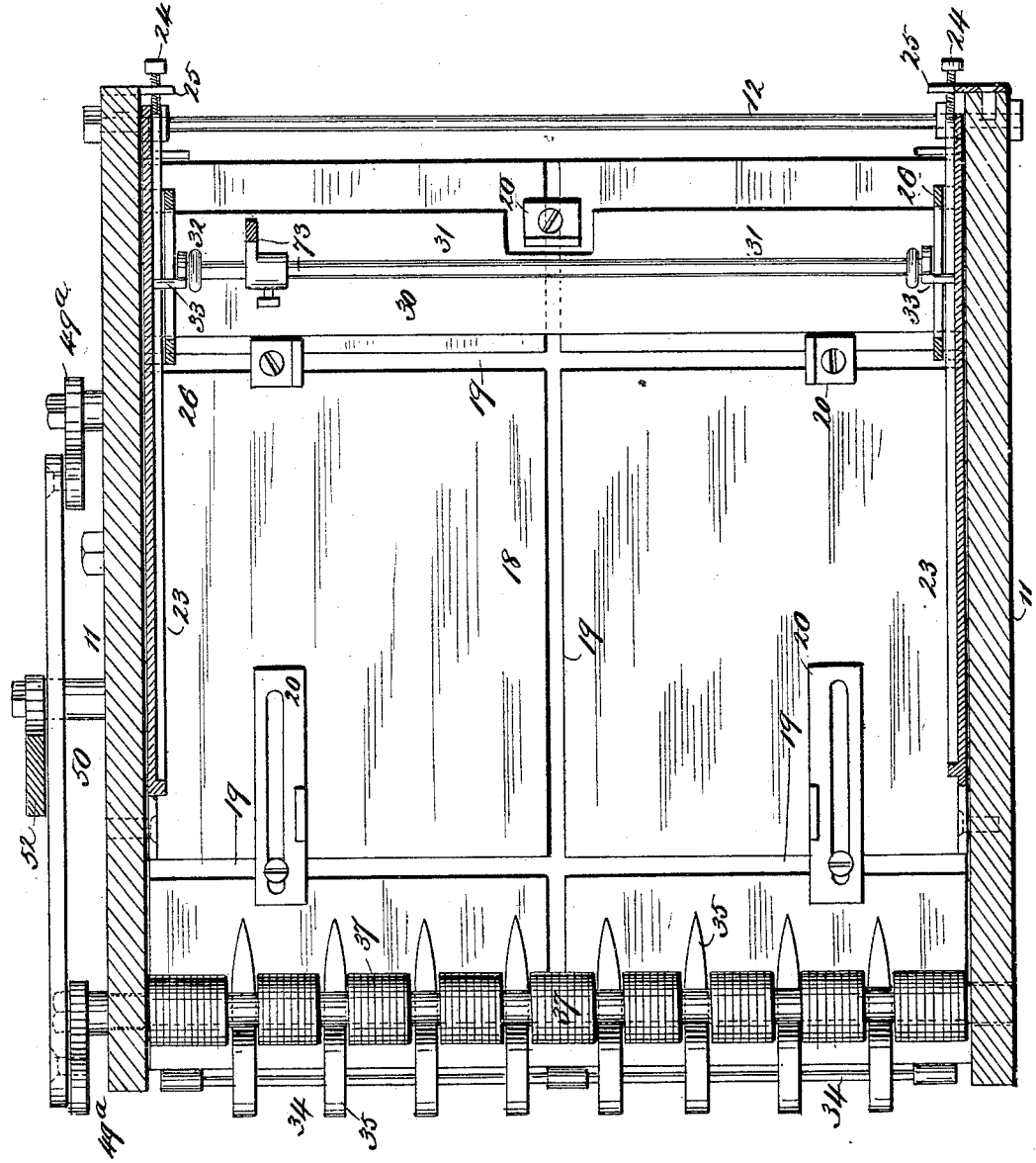

Figure 1 is a plan view. Fig. 2 is a central vertical and longitudinal section illustrating the fingers in the first position loosening the sheet; and Fig. 3 is a side elevation of the device, illustrating the position of the actuating mechanism when the fingers are thus operating. Fig. 4 is a detail view of the tension device. Fig. 5 is a central vertical and longitudinal section illustrating the finger as in the second position, delivering the sheet to the off-take roller; and Fig. 6 is a side elevation illustrating the position of the actuating mechanism when the fingers are in the second position. Fig. 7 is a horizontal section on line $z\,z$ of Fig. 2.

In carrying out the invention the frame consists of parallel side pieces 11, held a suitable distance apart and braced by two or more transverse rods 12, preferably provided with lock-nuts 13, and a back board 14, extending from the base a short distance upward. At the base, near each end, two or more transverse shafts 15 are journaled in the sides, from which shafts a series of metal fingers 16 radiate, having an upper cam-surface 17ª, as best shown in Figs. 2 and 5. The bottom 17 rests upon the aforesaid cam-fingers, which bottom is adapted to have a vertical movement. The bottom is usually constructed of wood, having a metal upper face 18, in which a series of slots are cut, extending, preferably, from the side to side and end to end, aligning larger parallel recesses produced in the bottom proper, whereby a series of T-grooves 19 are obtained adapted to receive the bolts of adjustable guide-standards 20, as best shown in Figs. 2, 5, and 7. The guide-standards are purposed to engage the edges of the paper 21 when placed upon the bottom or table 17 and keep the several sheets in proper order.

An angle or L shaped guide 22 is provided for the front end of the table, one being vertically attached to each side of the frame, as best shown in Figs. 2 and 5.

Upon the inner face of each side piece of the frame, above the table 17, a longitudinally-slotted guide-bar 23 is pivoted at its inner end and adjustably held in position by a set-screw 24, passing through a bracket 25 and engaging the free end of the said bar, as best shown in Figs. 2 and 5. A sliding guide-plate 26 is supported by the slotted guide-bars 23, which plate, extending down in front of the bar below the same, is provided in the bottom edge with a longitudinal recess 27, and a longitudinal slot 28 above said recess, exposing the slot in the said guide-bar 23. The sliding guide-plate is retained in a fixed position upon the guide-bar, preferably through the medium of a set-screw, as best shown in Figs. 2 and 5. A clamping bar or board 30 is held transversely above the table at the front, the ends of the same entering the recess 27 in the sliding guide-plate. The said clamping-bar is sustained through the medium of a rock-shaft 31, attached to the board and provided at the extremities with a disk 32, having a projection 33, integral with the periphery of the disk, the horizontal arm of which projection enters the slot in the pivoted guide-bar, as best shown in Fig. 7, passing through the slot 28 in the sliding guide-plate.

It will be observed that when the guide-plate is moved the clamping board or bar travels with it. Thus the latter may be adjusted to paper sheets of any length. It will also be seen that, since the clamp is carried by the pivoted bars 23, by adjusting the said bars the clamp can be raised or lowered to suit different kinds of paper. Hard and stiff paper requires more pressure to move it than soft and spongy paper, and since the clamp will settle into soft and spongy paper farther than it will into hard and stiff paper the necessity of the adjustment will be apparent, in order that sufficient bearing-surface may be given to the rubber to move the paper being fed.

A rod 34 is supported in suitable bearings above the back board of the frame, parallel therewith, upon which a series of needles 35 are hung, which needles, extending inward and downward over the sheets of paper, are purposed to separate a sheet of paper from the pile and guide it between the rollers 36 and 38, as shown in Fig. 5. Above the needles 35 a shaft 36 is journaled in the sides of the frame, carrying a number of preferably elastic friction-rolls 37, one roll alternating each needle, and above said shaft 36 a larger roll or drum 38 is pivoted, which drum engages the several friction-rolls 37, revolving the same.

The sheets of paper in feeding out are guided upward by the needles between the drum and friction rollers, as best shown in Fig. 5, the needles meanwhile holding the next sheet down. To an outer trunnion of the drum a pinion 38ª is keyed or otherwise secured, which meshes with a gear 39, fast to the projecting end of a cone-pulley shaft 40, journaled slightly in advance of the drum 38 and parallel therewith.

The cone-pulley shaft is connected by a belt 41 with a second upper similar shaft 42, journaled in the upper position of the frame immediately over the drum. The cone-pulley shafts are so located as that the reduced end of one pulley will be opposite the enlarged end of the other, as best shown in Fig. 1. A trip-block 42ª is attached to the projecting end of the upper cone-pulley shaft, having projecting from opposite faces at opposite ends, respectively, a pin 43 and 44, as best shown in Figs. 3 and 6. The said block is illustrated as of quadrantal form; but we do not limit ourselves to such contour.

In front of the upper cone-pulley shaft a transverse rock-shaft 45 is journaled, which I designate for convenience the "main" rock-shaft, and to the outer projecting end of said main rock-shaft a rocking lever 46 is keyed or otherwise secured, and to the extremities of the lever arms 47 and 48 are respectively pivoted, the arm 47 being pivoted to the outer face of the lower extremity and the arm 48 to the inner face of the upper extremity. Each of the said arms pass through and are supported upon a bracket 49ª, projecting outward from the side of the frame. The slots in the said bracket extend through the top, in order that the arms may have an uninterrupted upward movement.

The arms 47 and 48 are adapted at predetermined intervals to engage, respectively, with the pins 43 and 44 upon the trip-block, and to that end have their extremities concaved. The several positions of the arms are fully illustrated in Figs. 3 and 6.

The cam-shafts 15 are provided at one outer end with crank-arms 49, connected by a horizontal link 50, to which link, at or about the center of the same, the slotted vertical arm 51 of a segmental ratchet 52 is attached, the attachment being effected through the medium of a screw 53, passing through the slot 54 in the said vertical arm into the link, as illustrated in Figs. 3 and 6. The extremity of the ratchet-arm 51 is pivoted to the casing at or near the base. In the body of the ratchet a curved longitudinal slot 55 is produced. Above the ratchet 52 a bar 56 is held to reciprocate, being provided with a longitudinal slot 57 below the center, through which slot a pin 58 passes, secured to the outer side of the frame. In the upper end of the said reciprocating bar 56 a second slot is produced adapted to receive a pin 59, integral with the lower end of the rocking lever 46. The lower end of the bar 56 is provided with a threaded stud 60, having a collar 61 formed thereon at the intersection with the bar. The threaded portion of the stud is passed through the slot 55 in the ratchet, encircled by a coil or spiral spring 62 and a lock-nut 63, whereby a tension 64 is obtained. (Illustrated in detail in Fig. 4.) Adjacent to the ratchet, at the forward end and above the same, a pawl 65 is pivoted, adapted to engage the ratchet.

A finger-carrying frame 66 is suspended from the rock-shaft 45, adapted for reciprocation by said shaft, consisting of two horizontal bars 67, the rear bar being rigidly attached to the shaft 45 by vertical rods 68, and the forward bar adjustably secured to the said rear bar by set-screws 69.

The clamping-bars 67 are purposed to carry a series of elastic fingers 70, preferably constructed of rubber. The upper end of the said fingers, which is ordinarily the thinnest, is clamped between the rigid and adjustable bars 67 and supported at the back by pendent spring 71, as best shown in Figs. 2 and 5. A crank-arm 72 is secured to the rock-shaft 45, and a similar and aligning arm 73 is likewise secured to the lower rock-shaft 31, journaled upon the pressure bar or board 30, and the two crank-arms are united by an adjustable connecting-bar 74, the same consisting of two sections—a rod and a socket—the latter provided with a set-screw, as best shown in Figs. 2 and 5. The connecting-bar 74 is detachably attached to the lower crank-arm 73.

In operation the pile of sheets is placed upon the movable table 17 and properly held in regular order at the sides and ends by the guides 20, and the guide-arms 23, carrying the clamp 30, are adjusted according to the quantity of the paper, and the clamp adjusted on the said arms according to the length of sheets of paper. The upper shaft 42 is now turned in direction of the arrow, whereupon the gear 39, acting, rotates the drum 38, the shaft 42 revolving the trip-block 42ª. When the outer pin upon the said block engages the lower arm 47 of the rocking lever, the said lever is reciprocated, likewise the tension-bar 56, the position of the same being indicated in Fig. 3. The movements of the parts are so timed as that the rock-shaft 45 is rotated, causing the fingers 70, as shown in Fig. 2, to engage and carry the top sheet partially backward—that is, the sheet is buckled up centrally to withdraw the forward end from beneath the needles. At the same time the tension-bar 56 carries the ratchet 52 forward one tooth, which manipulates the link 50, causing the same to turn the cam-shafts 15 and thereby elevate the table. As the table is elevated, the connecting-bar 74, acting upon the lower rock-shaft 31, causes the latter to depress the clamping-bar 30. The clamping-bar, coming in contact with the paper, prevents the ratchet from raising the paper too high and the rear end thereof from being displaced. The ratchet thus acts just as the clamp is coming down, and when the paper strikes the clamp the tension will slip through the slot in the ratchet instead of raising the table farther. Upon the continued movement of the shaft the trip-block assumes the position shown in Fig. 6, wherein the upper arm 48 engages the inner pin 44. This movement, as indicated in Fig. 5, gives the rock-shaft 45 a reverse motion, which causes the clamping bar or board 30 to be slightly elevated, permitting the flexible fingers, in traveling forward, to carry the top sheet over the needles between the rollers 37 and drum 38, from whence it is conveyed to the press.

It will be observed that the rocking lever 46 when either of its arms are engaged, imparts to the fingers a sudden motion, either back or forth, standing still while the sheet is being disposed of by the drum.

Any size paper may be run through by changing the speed of the drum and the rocking lever.

Having thus described our invention, we claim as new and desire to secure by Letters Patent—

1. In a device for feeding paper, the combination, with an adjustable paper-carrying table, rock-shafts transversely journaled beneath the table, and cam-arms attached to said shafts, of a second rock-shaft above the table, elastic fingers suspended from said second shaft, and connections between said shafts, substantially as and for the purpose specified.

2. In a device for feeding paper, the combination, with an adjustable paper-carrying table, rock-shafts transversely journaled beneath the table, and cam-faced arms attached to said shafts, of a second rock-shaft above the table, a frame suspended from said second rock-shaft, flexible fingers secured in said frame, springs supporting the fingers at the rear, and a connection, substantially as shown and described, between the rock-shafts, as and for the purpose specified.

3. In a device for feeding paper, the combination, with an adjustable paper-carrying table, rock-shafts transversely journaled beneath the table, cam-faced arms attached to said shafts, and an adjustable clamping-bar held transversely above the table, of a second upper rock-shaft, an adjustable connecting-rod uniting said shaft and clamping-bar, flexible fingers suspended from the second rock-shaft, and a connection between said rock-shafts, substantially as shown and described.

4. In a device for feeding paper, the combination, with an adjustable paper-carrying table, rock-shafts journaled below the table, and cam-faced arms attached to said shafts, of slotted guide-bars horizontally pivoted above the table, a sliding guide-plate secured upon said guide-bars, a pressure or clamping bar, a rock-shaft pivoted upon said bar, provided with crank-arm passing through the sliding guide-plate into the guide-bar, and a second upper and parallel rock-shaft connected with the rock-shaft of the pressure-bar, substantially as shown and described.

5. In a device for feeding paper, the combination, with an adjustable paper-carrying table, rock-shafts below the table, and cam-faced arms attached to said shafts, of slotted guide-bars, a sliding guide-plate, a pressure or clamping bar, a rock-shaft journaled upon said bar, provided with crank-arms passing through the sliding guide-plate into the guide-bars, an upper rock-shaft, an adjustable connecting-bar uniting the said upper and lower rock-shafts, and flexible fingers secured to the upper rock-shaft extending downward to the table, all combined to operate substantially as shown and described.

GEORGE WOOLSEY CRANE.
HARRY BRADSHAW.

Witnesses:
JESSIE M. TIPTON,
FRANK DRUMMOND.